Jan. 9, 1968 J. B. CATALDO ETAL 3,363,147
MOTOR CONTROL COMBINATION UNIT FOR MOTOR CONTROL CENTERS
Filed July 18, 1966 14 Sheets-Sheet 1

INVENTORS
JOHN B. CATALDO
FRANK W. KUSSY
GEORGE H. FARNSWORTH
RICHARD J. SCHEICH
ALVA B. POWELL
OSTROLENK, FABER, GERB & SOFFEN
ATTORNEYS

Jan. 9, 1968   J. B. CATALDO ET AL   3,363,147
MOTOR CONTROL COMBINATION UNIT FOR MOTOR CONTROL CENTERS
Filed July 18, 1966   14 Sheets-Sheet 2
FIG.1B.
FIG.1A.
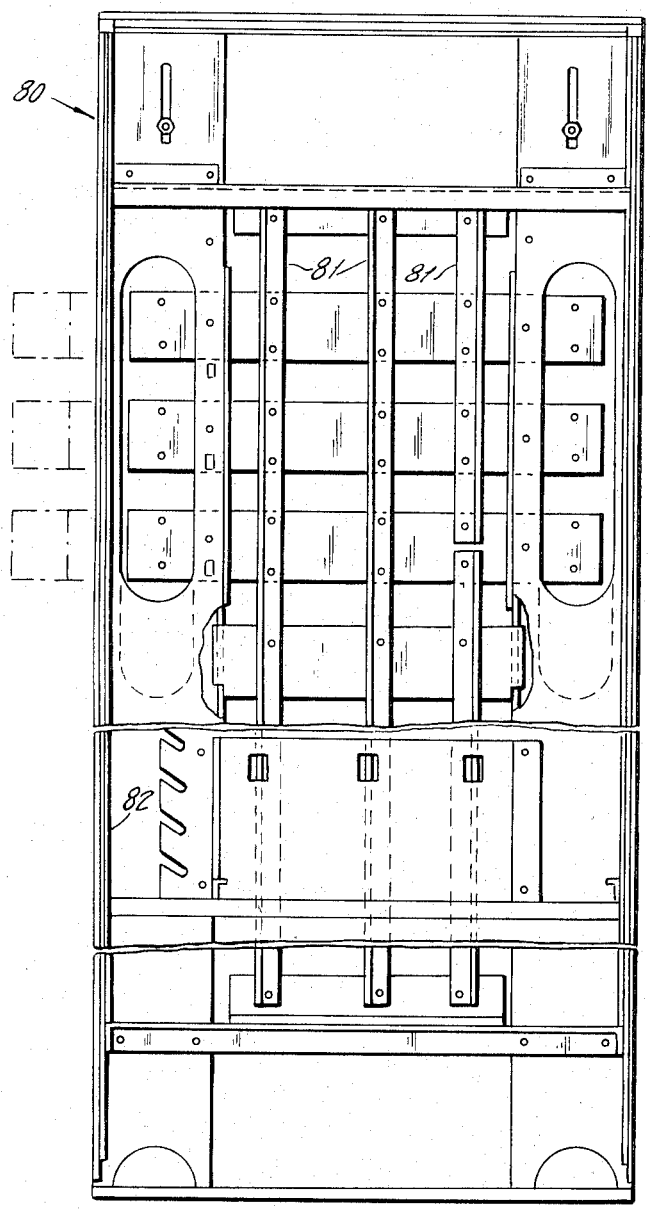
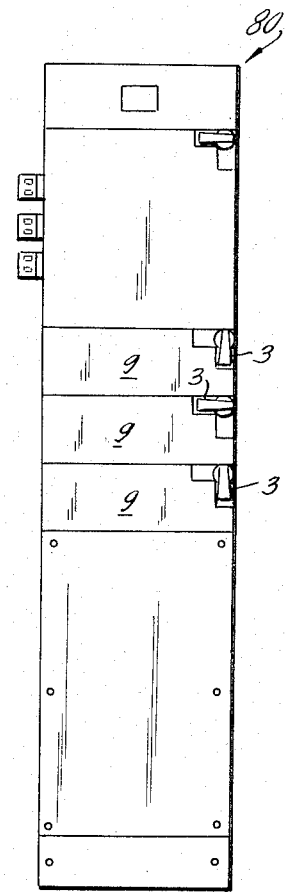
INVENTORS
JOHN B. CATALDO
FRANK W. KUSSY
GEORGE H. FARNSWORTH
RICHARD J. SCHEICH
ALVA B. POWELL
OSTROLENK, FABER, GERB & SOFFEN
ATTORNEYS Jan. 9, 1968　　　　J. B. CATALDO ET AL　　　　3,363,147
MOTOR CONTROL COMBINATION UNIT FOR MOTOR CONTROL CENTERS
Filed July 18, 1966　　　　　　　　　　　　　　14 Sheets-Sheet 3
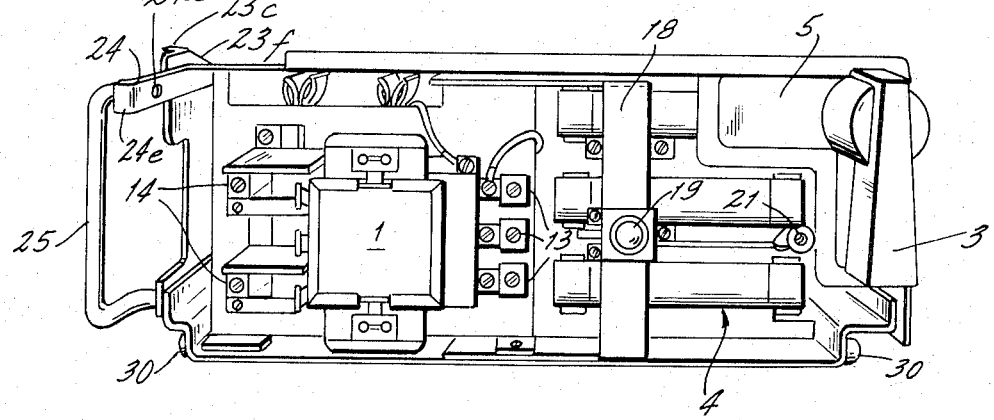
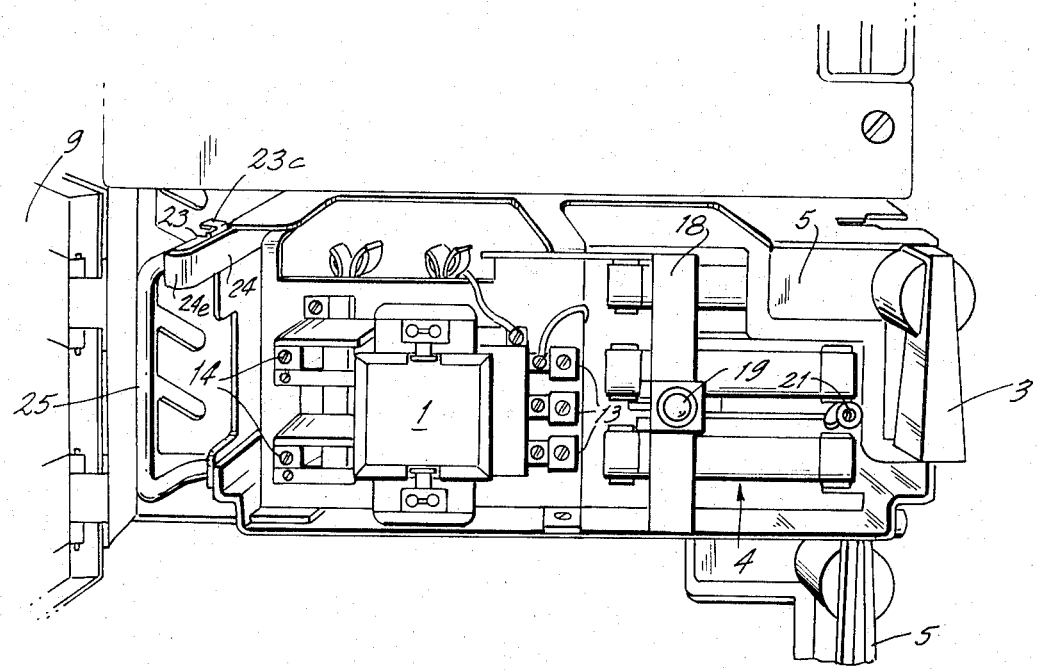
INVENTORS
JOHN B. CATALDO
FRANK W. KUSSY
GEORGE H. FARNSWORTH
RICHARD J. SCHEICH
ALVA B. POWELL
OSTROLENK, FABER, GERB & SOFFEN
ATTORNEYS Jan. 9, 1968  J. B. CATALDO ETAL  3,363,147
MOTOR CONTROL COMBINATION UNIT FOR MOTOR CONTROL CENTERS
Filed July 18, 1966  14 Sheets-Sheet 4
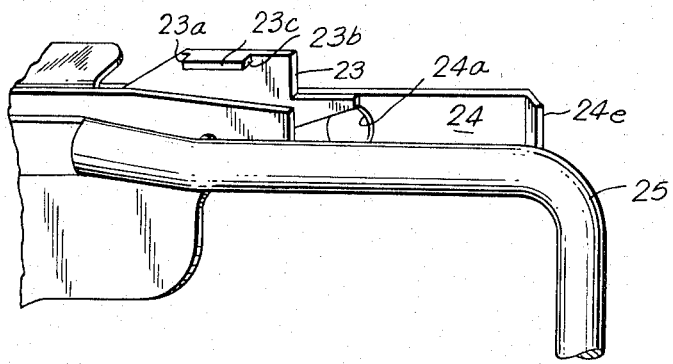
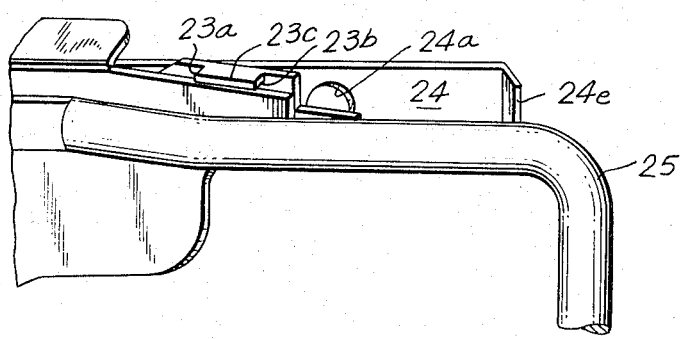
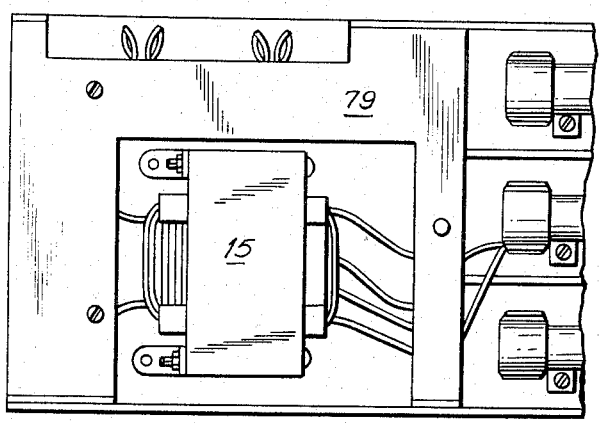
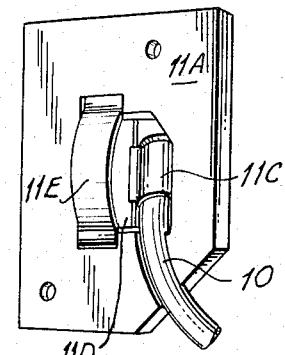
INVENTORS
JOHN B. CATALDO
FRANK W. KUSSY
GEORGE H. FARNSWORTH
RICHARD J. SCHEICH
ALVA B. POWELL
OSTROLENK, FABER, GERB & SOFFEN
ATTORNEYS

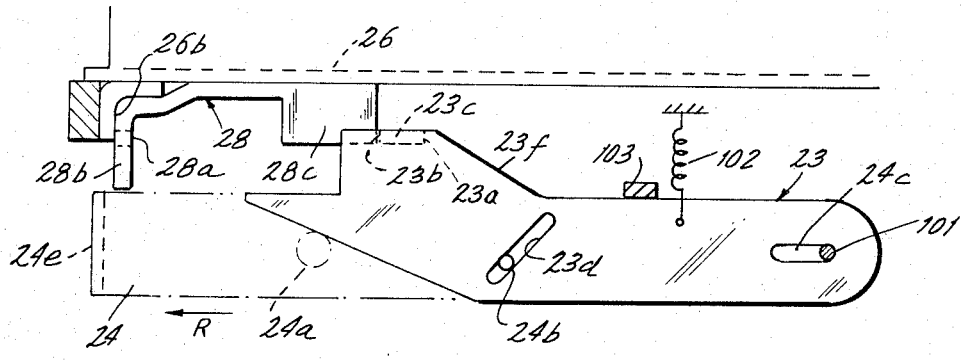
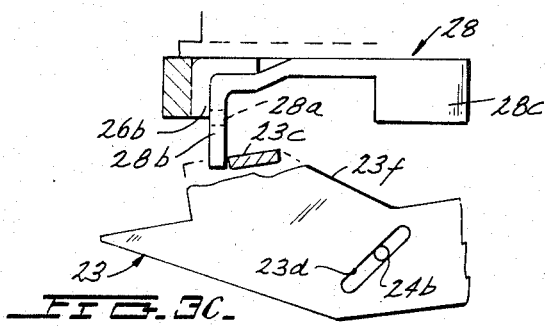
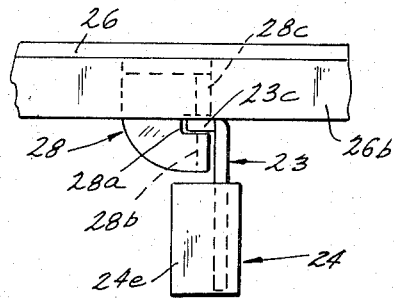
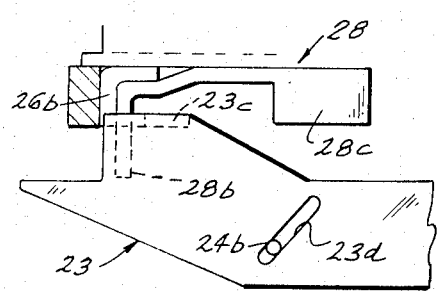
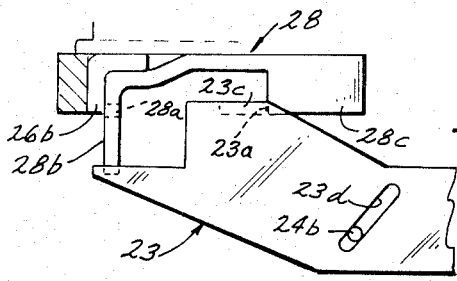

Jan. 9 1968   J. B. CATALDO ETAL   3,363,147
MOTOR CONTROL COMBINATION UNIT FOR MOTOR CONTROL CENTERS
Filed July 18, 1966   14 Sheets-Sheet 6

INVENTORS
JOHN B. CATALDO
FRANK W. KUSSY
GEORGE H. FARNSWORTH
RICHARD J. SCHEICH
ALVA B. POWELL

OSTROLENK, FABER, GERB & SOFFEN
ATTORNEYS

INVENTORS
JOHN B. CATALDO
FRANK W. KUSSY
GEORGE H. FARNSWORTH
RICHARD J. SCHEICH
ALVA B. POWELL
OSTROLENK, FABER, GERB & SOFFEN
ATTORNEYS

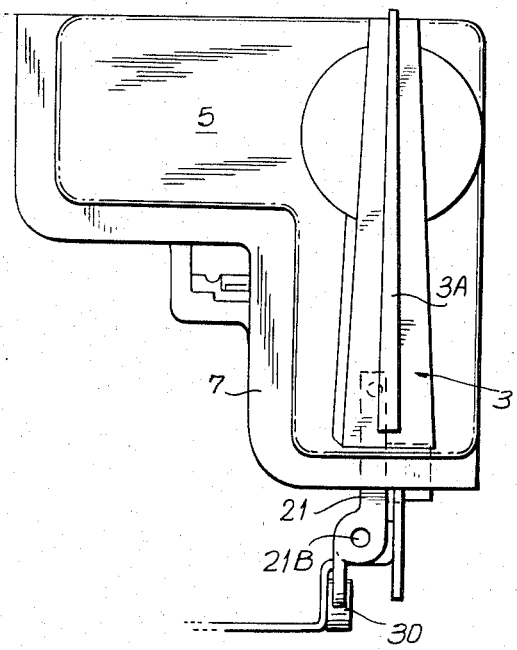
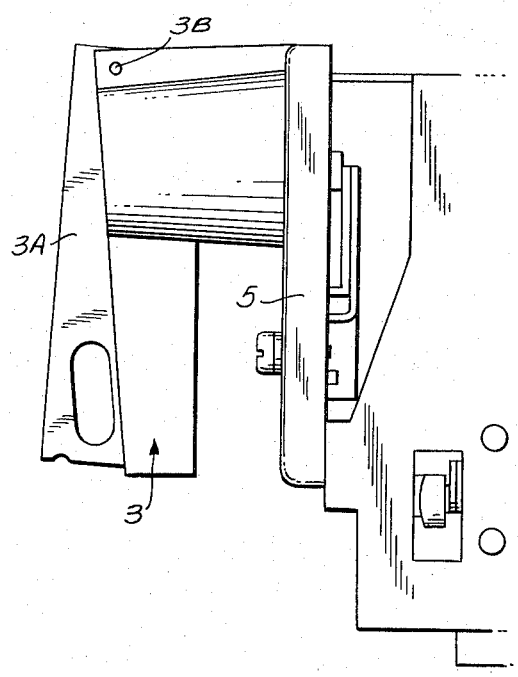
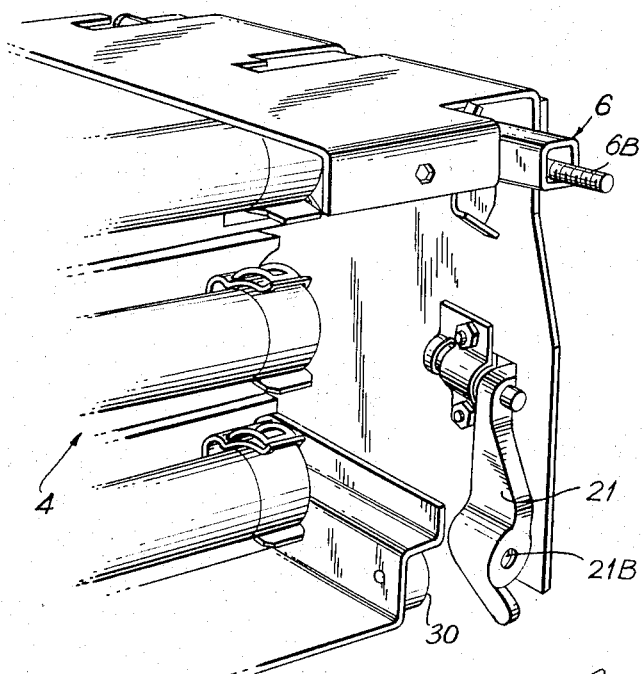
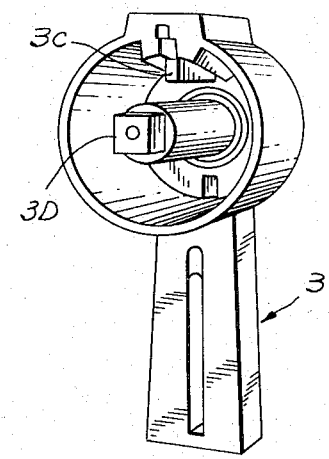

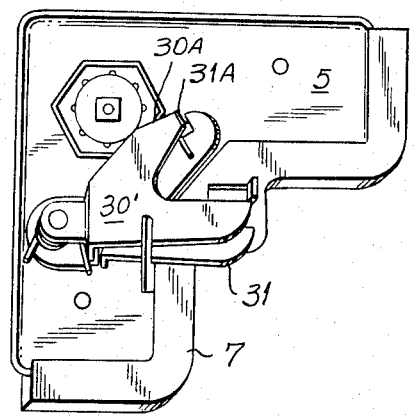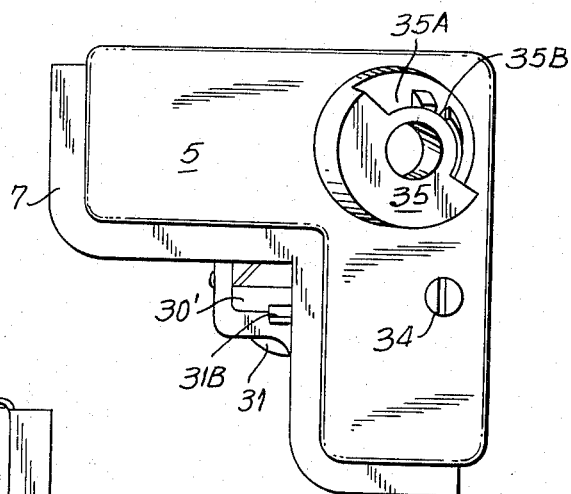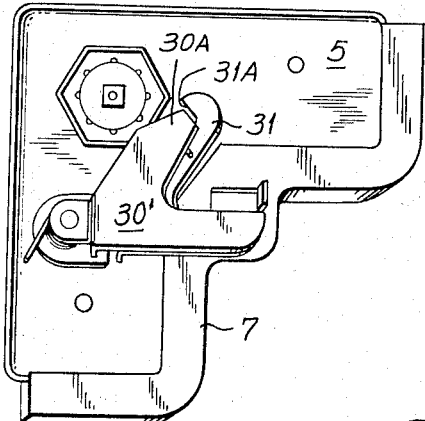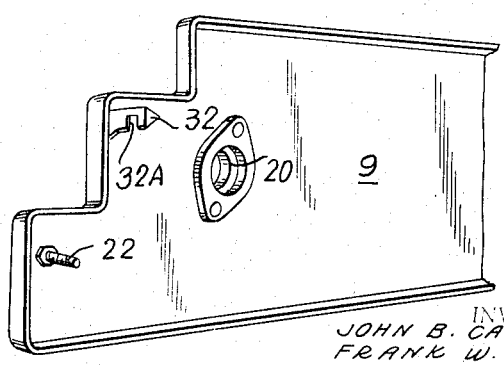

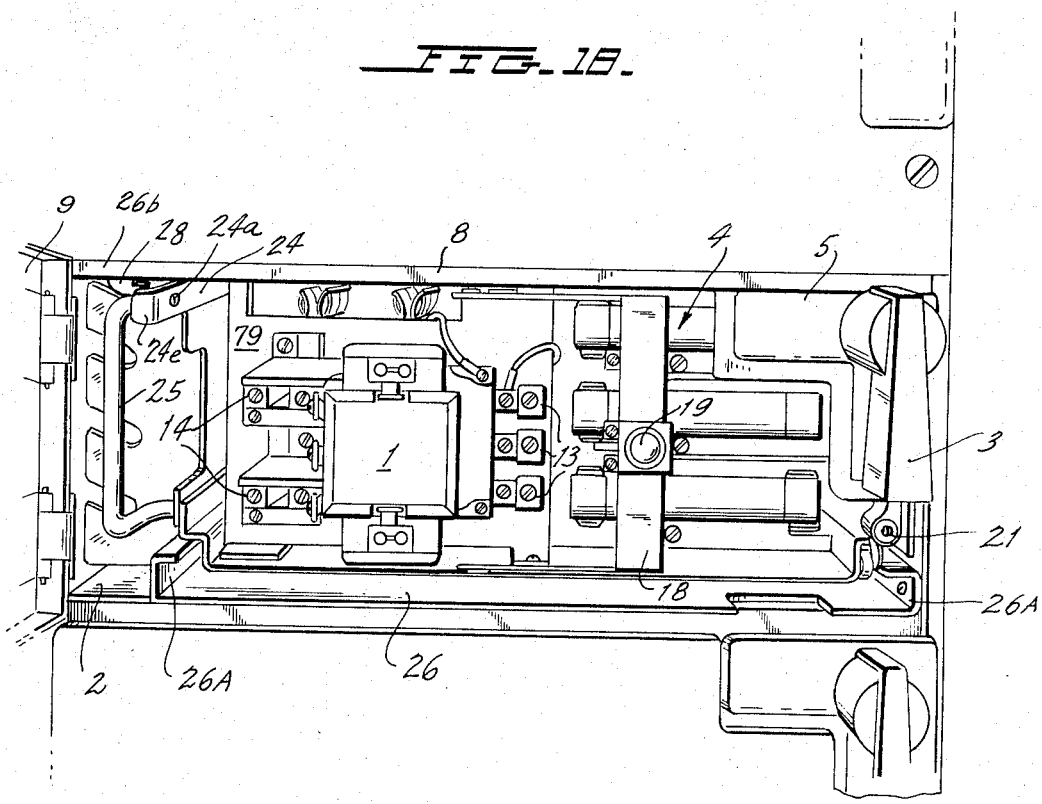
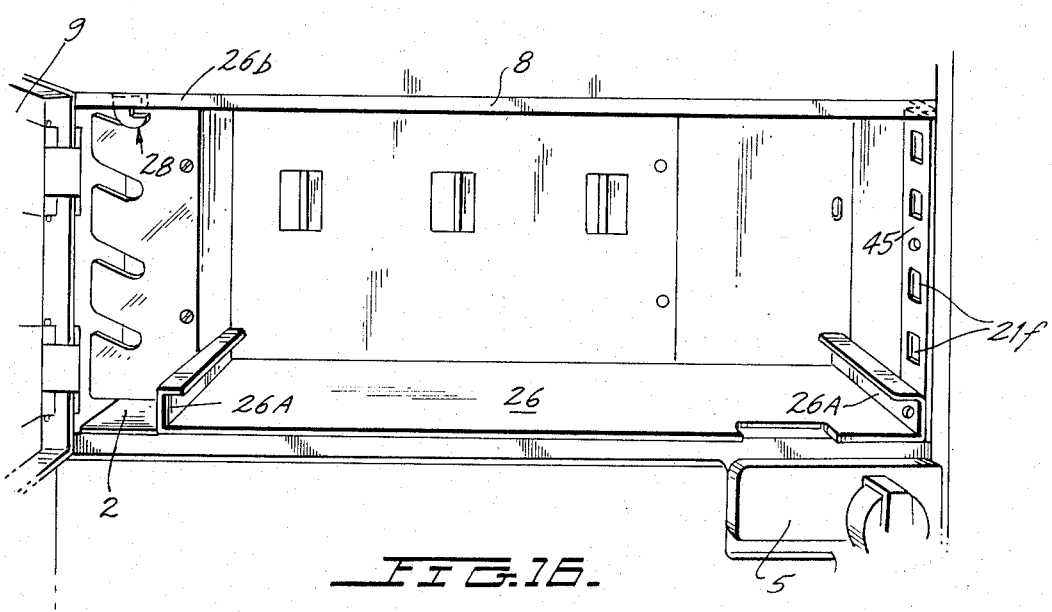

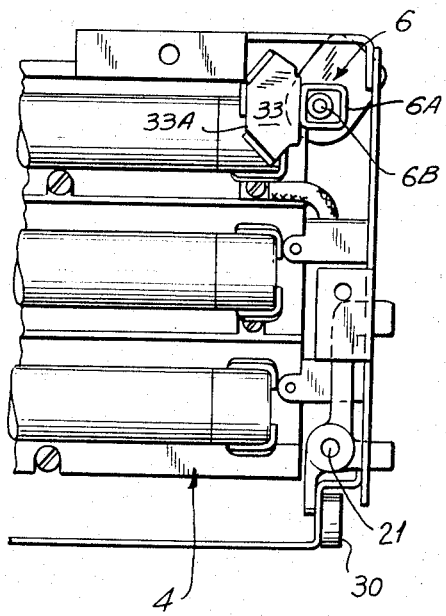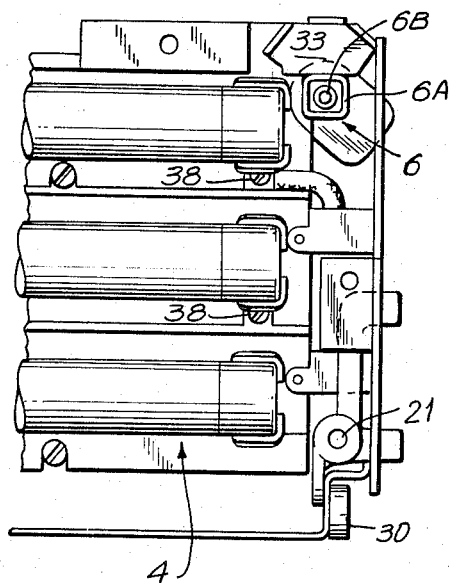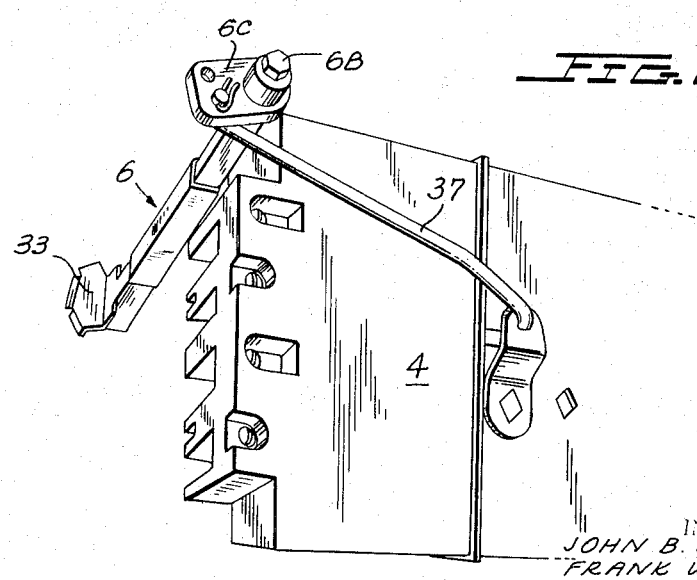

Jan. 9, 1968     J. B. CATALDO ET AL     3,363,147
MOTOR CONTROL COMBINATION UNIT FOR MOTOR CONTROL CENTERS
Filed July 18, 1966     14 Sheets-Sheet 12
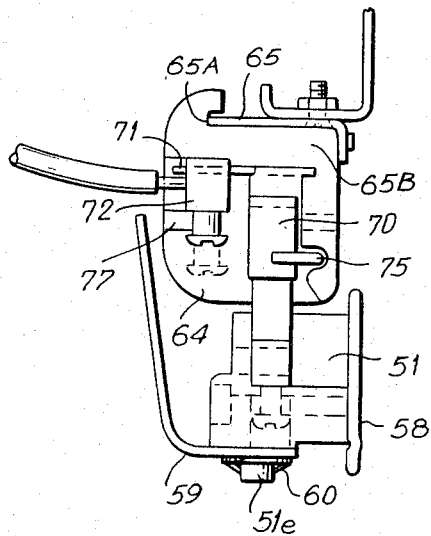
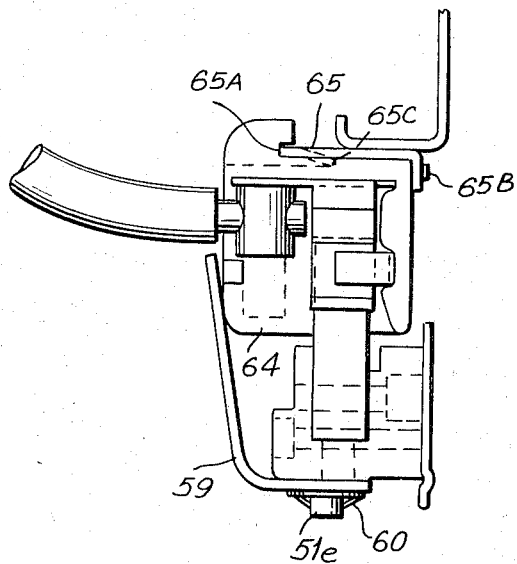
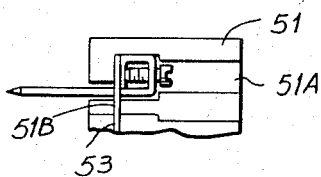
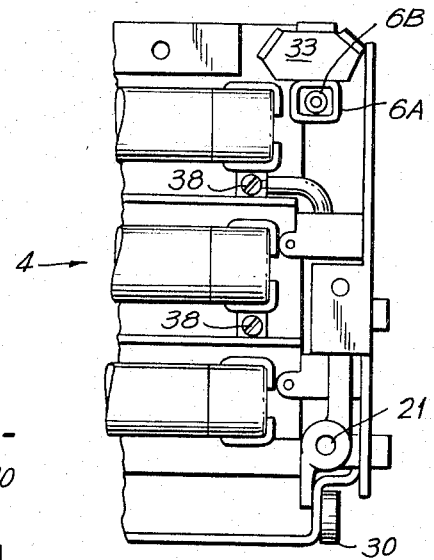
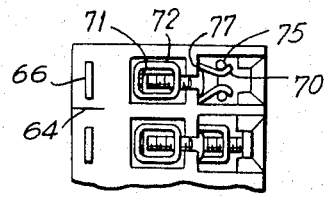
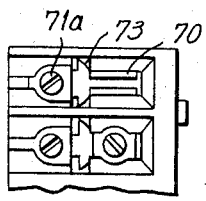
INVENTORS
JOHN B. CATALDO
FRANK W. KUSSY
GEORGE H. FARNSWORTH
RICHARD J. SCHEICH
ALVA B. POWELL
OSTROLENK, FABER, GERB & SOFFEN
ATTORNEYS

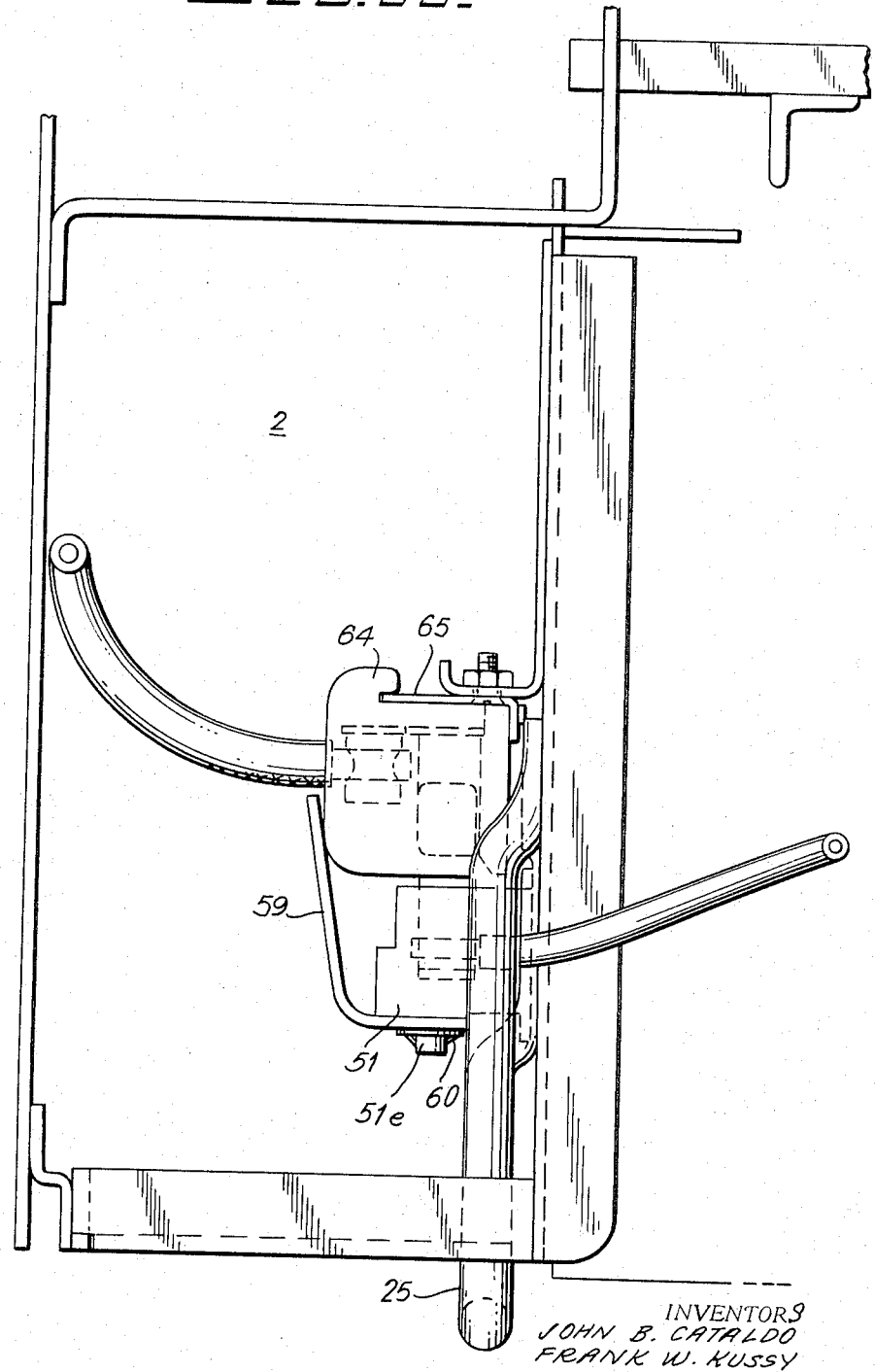

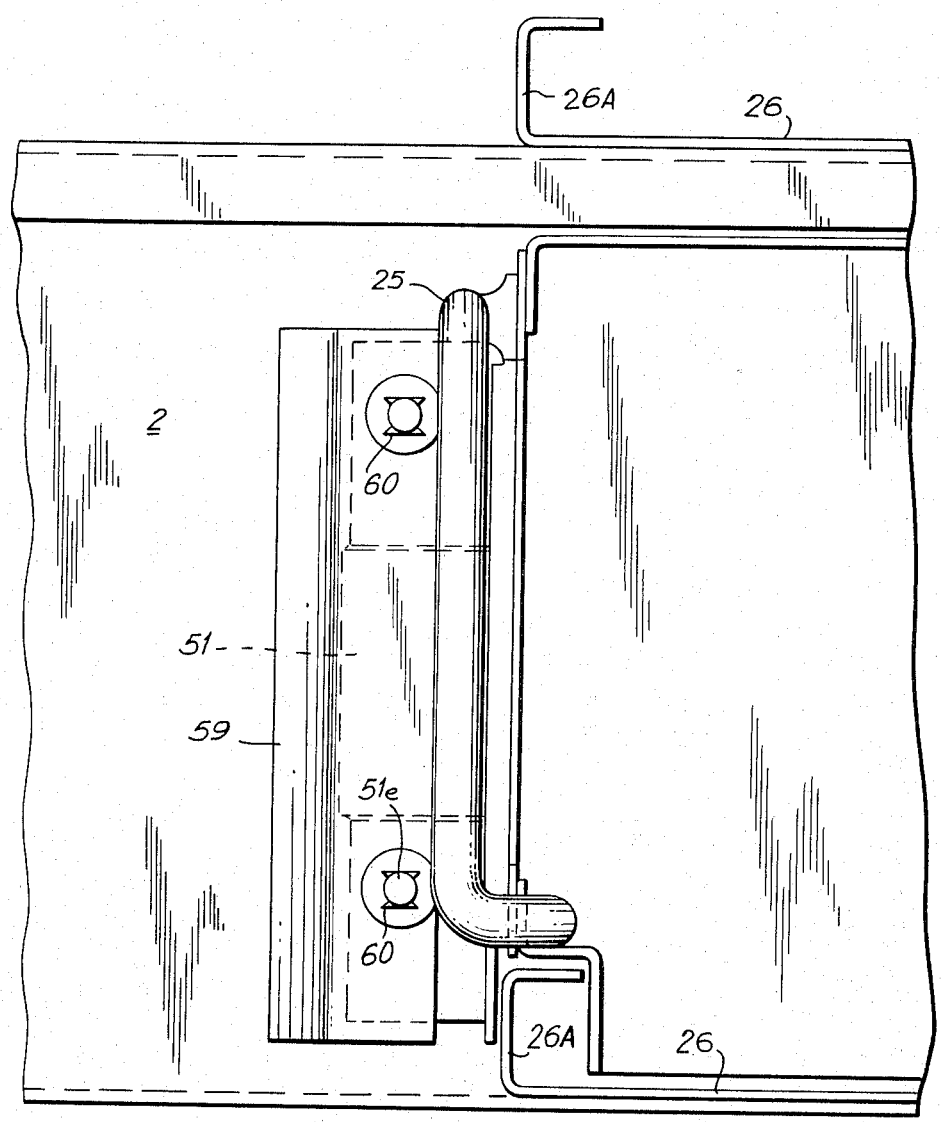

United States Patent Office 3,363,147
Patented Jan. 9, 1968

3,363,147
MOTOR CONTROL COMBINATION UNIT FOR MOTOR CONTROL CENTERS
John B. Cataldo, Bloomfield Hills, Frank W. Kussy, Birmingham, George H. Farnsworth, Grosse Pointe Woods, Richard J. Scheich, Harper Woods, and Alva B. Powell, Roseville, Mich., assignors to I-T-E Circuit Breaker Company, Philadelphia, Pa., a corporation of Pennsylvania
Filed July 18, 1966, Ser. No. 565,850
13 Claims. (Cl. 317—120)

ABSTRACT OF THE DISCLOSURE

Motor control combination unit for a motor control center, wherein the individual units are stacked vertically in the motor control center; each unit having a number of features: each unit being comprised of a compartment having horizontal members defining the top and bottom of each unit and vertical members defining the side and rear members of the unit; an openable cover provided on the front of each unit; a wiring gutter extending vertically up through one side of each of the compartments; weather stripping around the periphery of the opening of the front of each compartment; a motor control unit within each compartment, the motor control unit being slideable out of the openable front side of each compartment; motor control components connected to a support structure of which the unit is comprised including a control transformer, a motor starter, a motor starter disconnect means and a fuse means which may be used with the disconnect means; a rotatable operating handle positioned to be exterior to the front of door of each compartment for the disconnect means; the operating handle being rotatable through an angle of 90° and being mounted on a support plate positioned on the side of the compartment away from the aforementioned wiring gutter; and a plate-like support for the handle, the support having weather stripping extending inwardly away from the periphery thereof for insulating the compartment door when it is closed; both the starter and disconnect means having line terminals and load terminals on opposite sides thereof and being positioned adjacent each other; the load terminals of the starter being adjacent the wiring gutter and the line terminals of the starter facing the load terminals of the disconnect means; the transformer being positioned directly to the rear of the motor starter on the unit support structure; fuse clip means mounted on top of the control transformer, the control transformer having terminal means connected to the fuse clip means and the unit support structure having cutouts permitting access to the fuse clip means when the unit is partially withdrawn from its respective compartment; a pilot light connected to a pivotally mounted frame, whereby the light may be, alternately, positioned across the front of the support structure or pivoted away therefrom; a latch means connected with the door for preventing opening thereof when the operating handle is in the "on" position; each compartment having a downwardly extending lip for engaging the upper edge of the rear member of the mounting support structure beneath it to prevent the support structure so engaged from being fully withdrawn from its compartment without tilting upward of the unit; and a means for alternately permitting or prohibiting forward movement or complete removal of the unit from its compartment.

This invention relates to a novel unit which is adapted for reception in vertically arranged compartments of a main control cabinet or control center of the type shown in U.S. Patent 3,311,793, entitled Electrical Control Center, issued Mar. 28, 1967 in the name of F. W. Kussy et al. and assigned to the assignee of the present invention.

The arrangement set forth in the above noted patent provides a so-called control center which is a steel housing in which a plurality of electrical units may be easily contained and easily electrically connected to input and output buses and to one another. Control centers of the above noted type are useful for circuit control elements such as motor control devices, circuit breakers, and the like. Each of the compartments of the control center will have extending therethrough a common vertical bus bar arrangement connectable to terminals of the individual control units received within the various vertical compartments. Each of the control units, in accordance with the invention, will have a modular height or a height which is a multiple of a basic dimension with equal depth and width.

Each of the individual compartments have provision for attachment of horizontal bus bars to interconnect several compartments and provide means for making line side connection.

The novel control unit of the invention is of compact design with an operating handle in control of the controller located on the side of the unit opposite the wiring gutter. The operating handle extends through an L-shaped or rectangular fixed front member and is connected to a rotatable shaft extending from the handle to a disconnect switch. The disconnect switch (or suitable circuit breaker) is located so that its line terminals are located in the control center unit on the opposite side of the wiring gutter with the poles of the disconnecting devices located above one another.

A starter is aligned with the disconnecting device and has its line terminals adjacent the load side terminals of the disconnecting device and its load terminals adjacent the wiring gutter. Therefore, the disconnecting device and starter are wired and positioned along one line. The control transformer is then mounted behind the starter.

The terminals of the control transformer as well as control circuit fuses are then accessible from the top of the unit when it is partially or completely withdrawn from the motor control center. The controller is associated with a pilot light mounted on a pivotal bracket which indicates whether the controller is opened or closed. This bracket is normally positioned directly in front of the fuses and must be swung away from the fuses when they are to be replaced. A bull's-eye, or opening in the cover of the control unit allows the light to be visible with the cover closed.

In order to close the cover of the unit, it is necessary to first rotate a pivotally mounted holding means, which includes a tapped opening which receives a closing screw captured in the cover, to a predetermined position. Rotation of the pivotally mounted holding means causes latching to a Z-shaped upright member which is fastened to the side panel of the motor control center.

In order to pull the unit out of its compartment in the control center, it is necessary to first operate a latch which is operable from a button which is located adjacent the pull-out handle connected to the unit. Note that the unit may be carried on rollers at the bottom thereof so the unit will roll on the bottom tray of its compartment. This latch engages a slot within the support tray of the control center and the unit can be withdrawn only when this latch is released and the pivotal member mentioned above is rotated to its latch release position. The latch to the support tray may be further arranged to engage a second slot in the tray as the unit is being withdrawn so the unit can be held in a half withdrawn or test position. Padlocking provisions may also be made to padlock the latch in a predetermined position.

In order to move the unit within the cubicle, a wire handle is fastened to the side of the control unit adjacent the wiring gutter in such a manner that there is no obstruction of the wiring gutter or any of the devices in the control unit.

The tray atop the control unit and defining the bottom of the next highest compartment then has a downward lip extending from its front edge. This lip interferes with the top of the back plate of the unit when the unit is completely withdrawn. Therefore, the unit must be intentionally tilted upwardly to be removed from its compartment in the control center. As a further safety feature, two spring catches extending from the control unit remain engaged with the tray up to the fully withdrawn position. These catches can be released only after the operator releases his hands from the wire handle and interrupter handle so the unit cannot be accidentally dropped. These spring means also provide a reliable grounding means between the movable unit and stationary tray.

The back of the control is then provided with suitable plug-in finger contacts which plug into L-shaped bus bars on the rear plate of the control center. The plug-in fingers are arranged to float within insulating holding means and permit self-alignment with the L-shaped bus bars and give a compact design which requires minimum depth. The fingers are attached to a crimp-on wire grip or are soldered to the wire.

In accordance with a further feature of the invention, the plug-in load side terminal of the control unit consists of two parts; a stationary female block indirectly attached to the gutter strip of the control center, and a movable male terminal block attached to the motor control unit. The female block attaches to an L-shaped mounting strip by a bent ear arrangement. The stationary block described above has grooves therein in which the female jaws with a wire grip are held by friction and a screw head which is formed as a part of the wire grip. This stationary base then becomes useable with a square tube-type double-line box-type wire grip in place of the break jaw which makes it also possible to be used as a stationary terminal block. The terminal block may then be attached to L-shaped mounting means and connected to these mounting means with a suitable bent ear arrangement.

The male terminal block then has contact stabs nested in an insulating mounting and held in place by an insulating strip bearing against the contact stabs. These contact stabs are then bent in such a manner that they provide a box-type grip at one end of the stab in which the wire grip pressure screw is fastened.

From the foregoing, it is a primary object of this invention to provide a novel control center unit which may be contained within a vertical compartment of a control center in a novel manner.

Another object of this invention is to provide a novel control unit connectable within vertical compartments of a control center wherein the elements of the control unit have a modular height.

Yet another object of this invention is to provide a novel arrangement for control centers in which individual control units connectable to respective vertical compartments define a complete motor control arrangement.

Another object of this invention is to provide a novel motor control unit which has an operating handle located and always accessible at the front of the unit and at the side of the control center opposite the wiring gutter.

Another object of this invention is to provide a novel arrangement of weather-proof gasketing between the door or cover of the control center unit and the interior of the control center compartments.

A further object of this invention is to provide a novel control center unit having a disconnecting device, a starter device, and a control transformer wherein the line terminals and load terminals of the elements to be connected to one another are immediately adjacent one another with the line terminals of the starter immediately adjacent the wiring gutter running along one edge of the control unit, and with the control transformer mounted behind the starter.

A further object of this invention is to provide a novel arrangement for a control unit in which the control unit is withdrawable from the compartment with the control transformer terminals and control circuit fuses accessible from the top of the unit after it is partially or completely withdrawn.

Another object of this invention is to provide a novel pilot light arrangement which is pivotally mounted to lie flat against the fuses of a motor control circuit and which are pivotable away from the fuses with the light visible through a bull's-eye in the front of the door or cover of the control center unit.

A further object of this invention is to provide a novel rotatable latch or holding means which is pivotable to a position in which it receives fastening means for permitting the securement of the door which encloses a control center unit.

A further object of this invention is to provide a novel releasable latch arrangement for latching a control center unit in a plurality of positions within a control center with the latch operating means located adjacent the operating grip of the control center unit.

Another object of this invention is to provide a wire handle for a control center unit which is useful for moving the control center between various positions within the control center, and located so that there is no obstruction of the wiring gutter or any of the devices within the control center unit.

A further object of this invention is to provide a novel spring catch arrangement for holding a control center unit within the control center which catch arrangement may be released only after the operator's hands are removed from the handle of the device.

A still further object of this invention is to provide a novel plug-in finger arrangement along the rear side of the control unit wherein the plug-in fingers are attached to a conductor in a novel manner.

Yet a further object of this invention is to provide a novel arrangement for the plug-in load side terminal of a control unit.

These and other objects of this invention will become apparent from the following description taken in connection with the drawings, in which:

FIGURE 1A is a view of a control center containing the control center unit of the instant invention.

FIGURE 1B is an interior view of the control center of FIGURE 1A, with the control unit of the instant invention removed.

FIGURE 2 is a view similar to FIGURE 1 with the pivotally mounted pilot light pivoted into position across the fuses from its open position of FIGURE 1.

FIGURE 3 is a side plan view of the left-hand side latching mechanism and wire handle assembly.

FIGURE 3A is a fragmentary side elevation showing the relationship between the latching member for maintaining the control unit in its various operating positions, and the push rod for operating the latching member.

FIGURE 3B is a fragmentary front elevation showing the relationship between the latching member and push-rod of FIGURE 3A while the control unit is being inserted into a control center.

FIGURES 3C, 3D and 3E are additional fragmentary side elevations showing different operative positions for the latching member of FIGURE 3A. In FIGURES 3C and 3D the latching member is shown in different positions for maintaining the control unit in test positions. In FIGURE 3E the latching member is shown in position to prevent accidental movement of the control unit from test position to its fully energized position.

FIGURE 4 is similar to FIGURE 3, and illustrates the latching assembly in a latched position.

Figure 5:
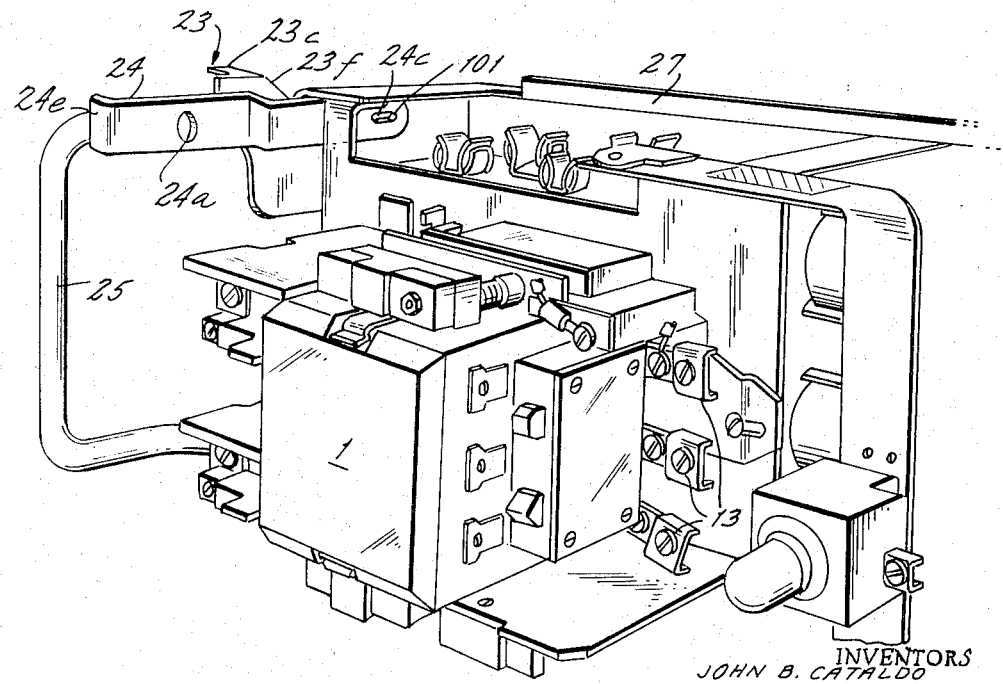

FIGURE 5 is a perspective view of the control center unit removed from the cabinet when looking from the right and slightly downwardly toward the left-hand side of the unit.

Figure 6:
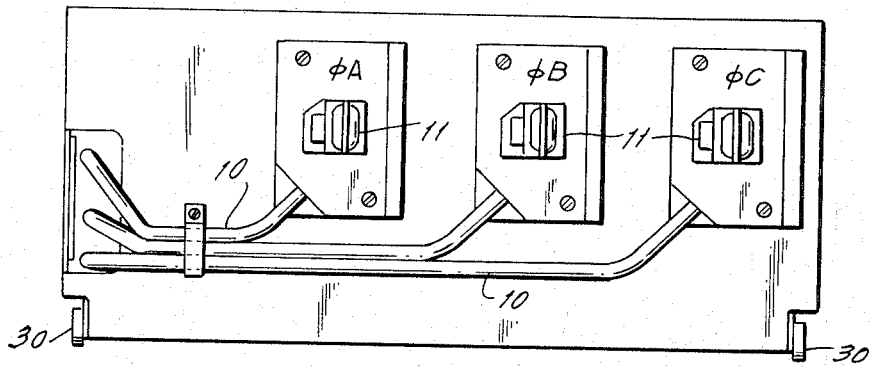

FIGURE 6 is a rear view of the control center unit.

Figure 7:
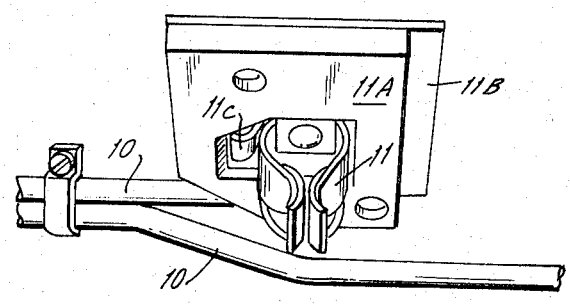

FIGURE 7 is a perspective view of one of the rear plug-in fingers at the rear of the control center unit.

Figure 8:
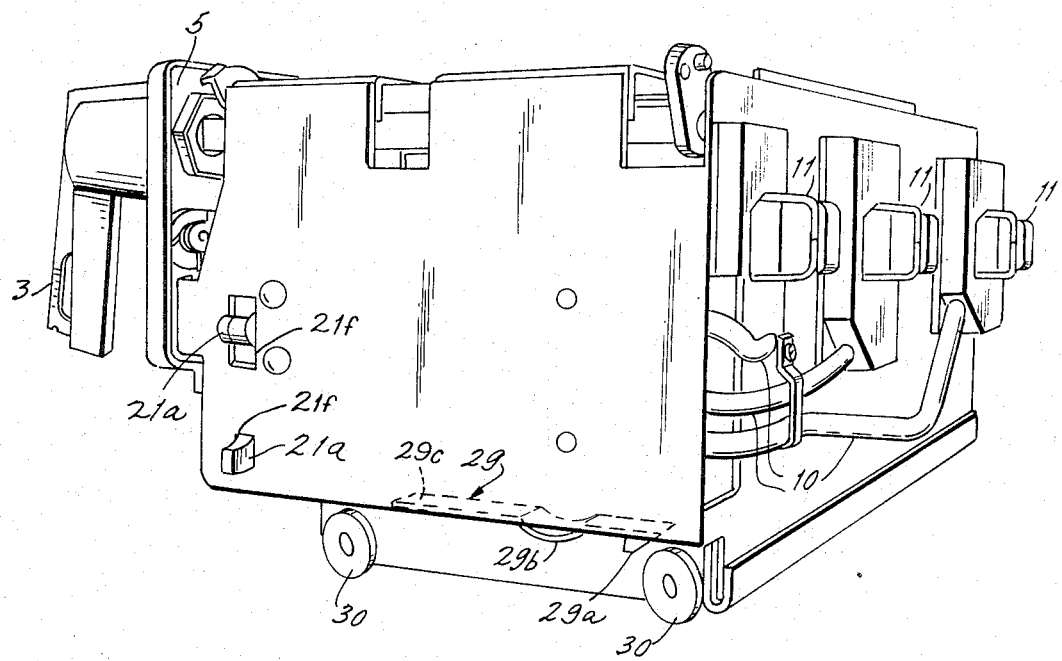

FIGURE 8 is a view from the rear and to the side of the control center unit.

Figure 9:
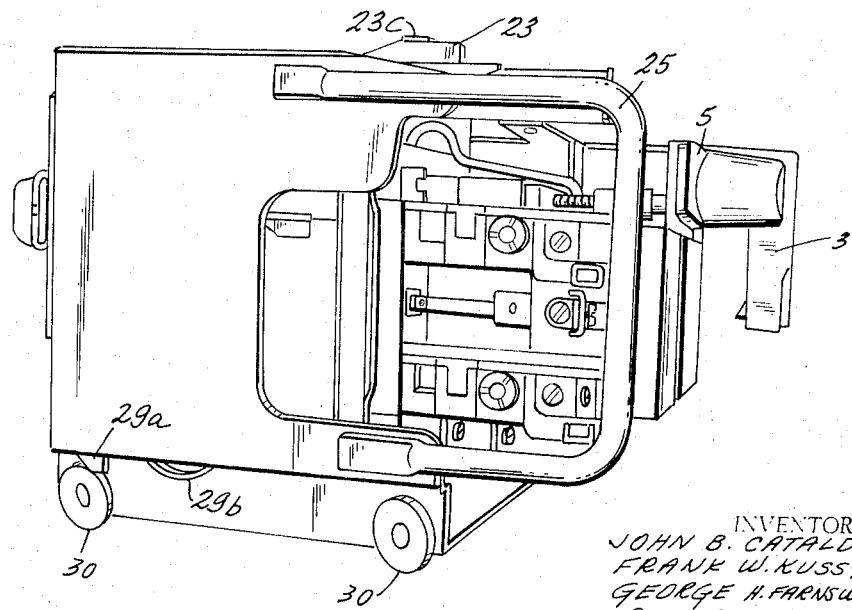

FIGURE 9 is a side perspective view of the control center unit.

Figure 10:
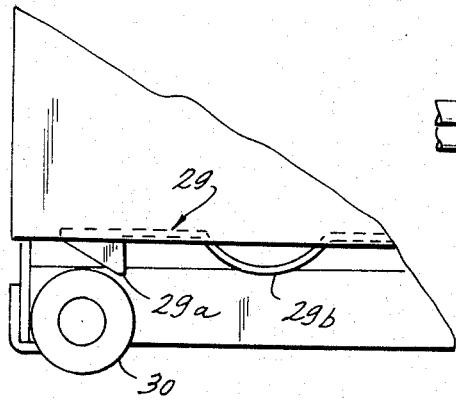

FIGURE 10 is an enlarged view of the spring catch mechanism for preventing the dropout of the unit when it is pulled to its full withdrawn position.

FIGURE 11 is a front view of the operating handle and support therefor.

FIGURE 12 is a partial perspective view of the control center unit and particularly illustrates the right-hand locking unit.

FIGURE 13 is a rear perspective view of the control center unit, and particularly illustrates the placement of a control transformer.

Figure 14:
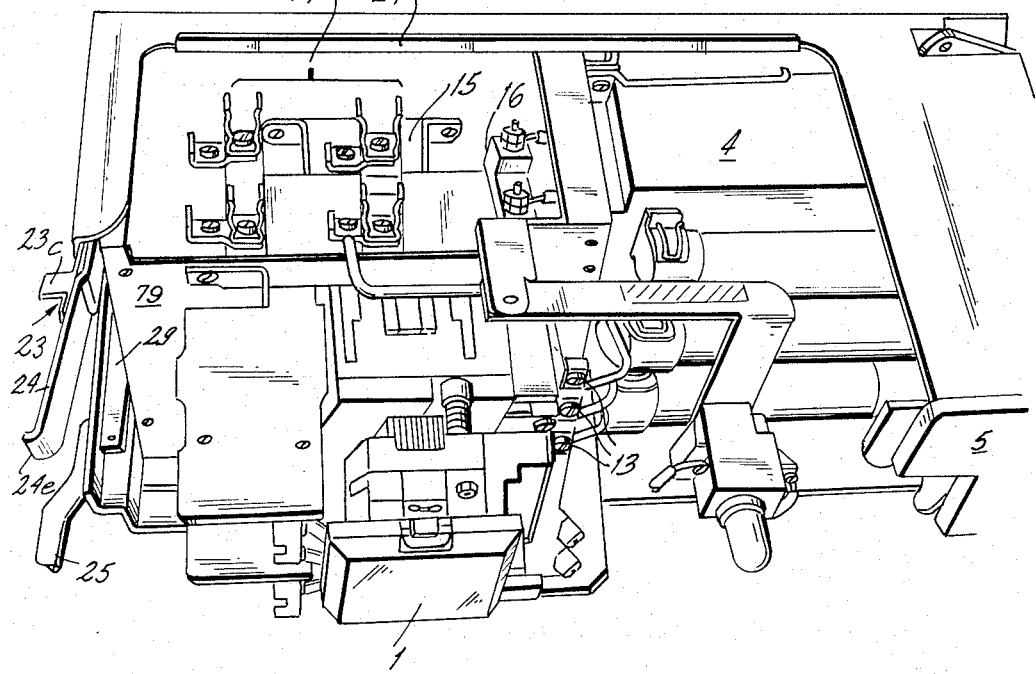

FIGURE 14 is a perspective view of the unit removed from its housing, and is taken from the top front of the removed unit.

FIGURE 15 is an interior view of the door or cover connected to the control center and which encloses the control center unit after it is installed in its cubicle.

FIGURE 16 is a front perspective view of the control center with the cubicle empty.

FIGURE 17 illustrates a control center unit installed into the empty cubicle of FIGURE 16 and in the withdrawn position.

FIGURE 18 is similar to FIGURE 17 and shows the control center unit having been rolled into the interior of its cubicle with the door open.

FIGURE 19 is a rear perspective view of the handle interlock mechanism.

FIGURE 20 is similar to FIGURE 19 with the interlock levers in a locked position.

FIGURE 21 is a front view of the operating handle support structure and illustrates the locking apertures in the handle hub.

FIGURES 22 and 23 are front perspective views of the disconnecting means and illustrate the interlock mechanism connected to the disconnect means operating shaft in alternate positions.

FIGURE 24 is a rear perspective view of the operating handle.

FIGURE 25 is a side perspective view of the operating handle.

FIGURE 26 is a rear perspective view of a portion of the disconnect means to illustrate the manner in which the operating handle shaft is connected to the disconnecting means.

FIGURE 27 is a top view of a portion of the disconnecting means to illustrate the placement of the load side terminals thereof.

FIGURE 28 is a perspective view of the housing assembly for the rear plug-in terminals of the device of the present invention.

FIGURE 29 is a top cross-sectional view of the gutter portion of the cubicle to illustrate the placement of the plug-in terminals for the control center unit.

FIGURE 30 is a front view of FIGURE 29.

FIGURES 31 and 32 are alternate views of the male plug-in assembly of FIGURES 29 and 30.

FIGURES 33, 34 and 35 are alternate views of the female disconnect portion of the plug-in terminals of FIGURES 29 and 30.

As previously ponted out, the above noted invention has particular utility when used with a control center of the type described in aforementioned U.S. Patent No. 3,311,793 and shown in FIGURES 1A and 1B herein. The following figures describe for the most part the manner in which a novel control center unit, or a unit which can be connected within the compartment of such a control center 80, would be constructed. Thus, the disclosure of the above noted copending application is incorporated into the present disclosure by reference.

It will be further observed in the following that the specific control center to be described is for a motor control application utilizing a motor starter, a disconnect device which may be fused, and a control transformer. A suitable starter construction is shown in U.S. Patent No. 3,324,431, issued June 6, 1967 for an Electromagnetic Contactor Having Interchangeable Auxiliary Devices with J. B. Cataldo et al. as inventors. A suitable fused disconnect device is shown in U.S. Patent No. 3,217,130 issued Nov. 9, 1965 for a Circuit Interrupter Casing and Base with J. B. Cataldo et al. as inventors. Both of the aforesaid inventions are assigned to the assignee of the instant invention.

Figure 1:
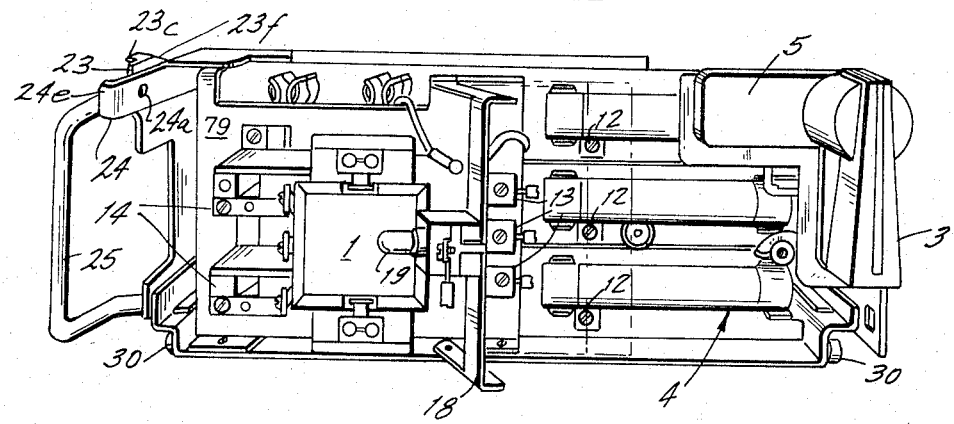
FIGURE 1 is a perspective view of a control center unit constructed in accordance with the present invention with the control unit removed from the control center.

The arrangement of the basic motor control unit is such that the starter assembly 1, shown in FIGURES 1, 5, 14 and 18, is suitably connected to the base of the steel drawer which defines the carrier for the control unit and is positioned immediately adjacent to the wiring gutter 2 of the control center major support structure, as best shown in FIGURE 18 and FIGURE 16. Note that FIGURE 16 shows the interior of the control center with the motor control center unit removed. An operating handle 3 is then permanently attached to the control unit so that it is always in control of the disconnecting device 4 which is mounted behind the handle 3 and to the right of starter 1, as best shown in FIGURES 1, 14 and 18. The disconnecting device 4 has suitable fuse elements associated therewith, and may be either a switch (as shown) or a suitable circuit breaker.

The handle 3 is mounted on fixed member 5 which is secured to the control unit frame and engages a rotary shaft 6 which is a connector between the handle 3 and the switching device 4 and is partially shown in FIGURE 12, as extending outwardly from the switching device 4 located behind the fuse elements shown. The fixed member 5 of the control unit may be L-shaped, as shown in the drawings, when used with a handle having a 90° rotation, and would be rectangularly shaped when used with a handle having 180° rotation. It is important to note that the fixed member 5 and the control handle 3 mounted thereon are mounted on the side opposite the wiring gutter 2.

In order to provide a weather-proof seal when the control unit is contained within its cubicle and the door is closed, the fixed member 5 is provided with suitable weather-stripping 7, shown, for example, in FIGURES 11, 19, 20 and 21, which cooperates with the weather-stripping 8, shown in FIGURE 16, and which surrounds the outer edge of the cabinet opening to form a continuous seal when the control unit is contained within the cabinet, and the door 9, shown in FIGURES 15, 16 and 18, is closed. Note that of a control unit is not contained within the cabinet of the control center, a suitable filler plate (not shown) which is the same size and shape as the fixed member 5, and having the same sealing provisions and equipped with an appropriately located tapped opening which could be used to receive the sealing screw of the door 9, as will be described later, and as is shown in FIGURE 15, would replace the fixed member 5.

The position of disconnecting device 4 is such that the line terminals 38 of the device are located directly behind fixed member 5, as shown in FIGURE 27, which shows the line side connections of the disconnecting device 4 with the fixed member 5 removed. This location is very convenient for the connection of conductors 10, shown in FIGURE 6, which are attached to the plug-in fingers 11 which are located at the rear of the motor control unit frame. This position places the load terminals 12 of FIGURE 1 of the disconnect device 4 close to the line terminals 13 of starter 1.

The line terminals 13 of starter 1 are further shown in FIGURES 14 and 18. Thus, the load terminals 14 of starter 1 may be adjacent the wiring gutter, as shown in FIGURE 18 as well as FIGURES 1 and 2.

The position of starter 1 is further such that space is provided for control transformer 15, as shown in FIGURES 13 and 14, to be located directly behind the starter 1. Starter 1 is mounted on plate 79 (FIGURES 1, 13, 14, 18) and transformer 15 is mounted on the back plate 79 of the unit (FIGURE 13). Thus, the leads of the control transformer 15 which terminate at the terminal block 16 and the fuse block 17, as shown in FIGURE 14, are accessible from the top of the unit when the control unit is in the withdrawn position, shown, for example, in FIGURE 17, with respect to the control center.

As then shown in FIGURES 1, 2 and 18, the swinging bracket 18 which carries a suitable pilot-light 19 is pivotally mounted upon the frame of the control center unit. When the unit is in use, the bracket 18 will be located in front of the disconnecting device, as shown in FIGURES 2 and 18, with the pilot-light 19 being visible through the bull's-eye 20 in the cover 9, as shown in FIGURE 15.

In order to gain access to the disconnecting device 4, the bracket 18 can swing over and in front of starter 1, as shown in FIGURE 1. The control unit structure is then secured within the control center on the right-hand side thereof by pivoted member 21, shown in FIGURES 2, 12 and 18, which is attached to the side of the control unit.

As best shown in FIGURE 8, the pivoted member 21 has fingers 21a extending therefrom which pass through openings in the side wall of the control unit frame and thence into suitable slots 21f (FIGURE 16) in the channel 45 of the main control center. When the control center unit is removed from the control center, or is moved to the test or withdrawn position, the member 21 must be rotated to the unlatched position, shown in FIGURE 2. When the unit, however, is completely installed within the control center, the member 21 must be in the latched position, shown in FIGURE 12, before the door 9 of FIGURE 15 can be sealed with the screw 22 captured within door 9 engaging the tapped opening 21B in the member 21 of FIGURE 12. Note that this securement will maintain the projections 21a of FIGURE 8 extending through the side wall of the control unit frame and into engagement with receiving slots 21f in the control center structure.

The securing means on the left-hand side of the control center unit consists of a latching member 23, shown best in FIGURES 1, 3 and 4, which is operated by push-rod 24 and is operatively connected thereto in such a manner that when the push-rod moves horizontally, the latching member 23 moves vertically and downwardly and across the opening 24a in member 24. Opening 24a can receive a padlock to lock the latching member 23 in either of the positions shown in FIGURES 3 and 4.

The push-rod 24 is located adjacent wire handle 25 on the left-hand side of the control unit in such a manner that operation of the rod 24 by the thumb of the left hand is a natural operation through engagement with forward offset 24e of push-rod 24. The latching member 23 has two latching surfaces 23a and 23b which engage portions of member 28 secured to tray 26 (FIGURES 16 and 18) of the next upper cubicle in the control center for reasons which will now be explained with particular reference to FIGURES 3A through 3E.

Pin 101 at the rear of latching member 23 provides a pivotal connection between member 23 and the control unit frame and also provides guidance for push-rod 24 by extending through horizontal slot 24c in push-rod 24. Tension spring 102 connected from the frame of the control unit to member 23 biases member 23 counterclockwise with respect to pivot 101 and acts through pin 24b to bias push-rod 24 upwardly or in a counterclockwise direction with respect to pin 101. Upward movement caused by biasing spring 102 is limited by control unit frame projection 103. A spring (not shown) connected between the control unit frame and push-rod 24 biases the latter forward or in the direction indicated by arrow R. Pin 24b, extending from rod 24 transverse to the plane thereof, projects into inclined slot 23d of latching member 23 so that movement of rod 24 to the left or forward or in the direction R with respect to FIGURE 3A causes member 23 to pivot clockwise about pin 101.

As best seen in FIGURES 3, 3A and 3B, latching surfaces 23a and 23b are at opposite side edges of horizontally projecting ear 23c. When the control unit is being inserted into the control center, sloping portion 23f at the upper edge of member 23 is engaged by the lower edge of angle 26b depending from member 26 camming ear 23c downward into alignment with notch 28a in member 28 thereby permitting ear 23c to move to the rear of the forward section 28b of member 28 which is positioned in a vertical plane parallel to the front of the control center. Member 28 includes another portion 28c positioned to the rear of portion 28b and disposed in a vertical plane at right angles to the plane of portion 28b.

As best seen in FIGURE 3E, when latching member 23 is in its most upward position ear 23c is disposed so that surface 23a engages bracket portion 28c to prevent accidental movement of the control unit to its fully energized position of FIGURE 3A from the test position of FIGURE 3D. In addition, with latching member 23 fully raised surface 23b is engaged by bracket portion 28c (FIGURE 3A) to prevent movement of the control unit from its fully energized position.

By moving push-rod 24 to the right with respect to FIGURE 3A, the cooperation of pin 24b and inclined slot 23d moves ear 23c below portion 28c so that ear 23c may be moved to the left (with respect to FIGURE 3A) of portion 28c to disconnect the control unit from the bus bars of the control center. If push-rod 24 is released when ear 23c is between portions 28b and 28c, ear 23c rises to a position where it is engageable with portion 28b above notch 28a (FIGURE 3D) to prevent withdrawal of the control unit from the control center. With ear 23c positioned low enough to clear the bottom of portion 28c, ear 23c is at a height to engage portion 28b below notch 28a (FIGURE 3C) also preventing complete withdrawal of the control unit from the control center. It is only when latching member 23 is operated to position ear 23c in alignment with notch 28a that the control unit may be fully withdrawn from the control center.

Handle 25 (FIGURE 1) is at the immediate end of the control unit and between the edge of the control unit and the wiring gutter. Thus, the handle 25 does not interfere in any way with access either to the wiring gutter 2 or the starter 1, as shown best in FIGURES 9 and 18.

The complete assembly is then carried within the cubicle and is rollable within the cubicle through the provision of rollers 30 mounted on the bottom side corners of the control unit, as shown in FIGURES 8 and 9, which are guided in the runners 26A of the tray 26 shown in FIGURES 16 and 18. Thus, the complete assemblage is rollable within the cabinet having the tray 26 as a bottom.

In order to prevent the control unit from inadvertently sliding completely out of the cabinet, an upwardly extending lip 27, best shown in FIGURES 5 and 14, is provided along the top rear of the unit and holds the unit in the withdrawn position by stopping against the bottom front edge of the tray 26 immediately above it, as shown in FIGURE 17, which shows the unit in the withdrawn position.

After the unit has been moved to its withdrawn position, the spring catches 29, 29, best shown in FIGURES 8, 9 and 10, must be released so that the control unit may then be pivoted upwardly allowing lip 27 to clear the edge of tray 26 thereabove. Each of the catches 29, 29 is a spring member anchored at its end 29c to the control unit frame and having a hook 29a at its opposite end. Curved downward extension 29b is accessible for hand operation to release hook 29a from engagement in a slot of tray 26.

The line side electrical connection to the control center is made by means of the plug-in fingers 11, shown in FIGURES 6, 7 and 28, which engage vertical bus bars 81 within the control center 80 (FIGURE 1B) which are arranged in the manner disclosed in the above noted Patent No. 3,311,793.

The plug-in finger 11 is trapped between the base 11A and an insulating plate 11B, as shown best in FIGURES 7 and 28. The finger 11 is permitted to move into the slot 11D, shown in FIGURE 28, of the base 11A, and is cushioned by the spring 11E of FIGURE 28. This permissive movement within the slot 11D permits finger 11 to align itself on the bus bar of the control center. The conductor 10 is then staked to the finger 11 by the use of a formed tang 11C, shown in FIGURES 7 and 28.

Referring now to FIGURES 1 and 18, the handle 3 is so interlocked with the door 9 of the control center that if the door 9 is opened, a by-pass arrangement must be operated before the handle can be turned to an ON position. Moreover, if the handle 3 is in the ON position, another by-pass must be operated in order to open the door. This is accomplished through the use of two Y-shaped levers 30' and 31, shown in FIGURES 19 and 20, which engage the finger 32, shown in FIGURE 15, which is attached to door 9.

The levers 30' and 31 are independently spring biased in counterclockwise directions by suitable biasing springs. When the door 9 is closed and the handle 3 is in the ON position, the levers 30' and 31 are in the position shown in FIGURES 21 and 20. Thus, the lever 30' has engaged the finger 32 in slot 32A, thereby preventing the opening of the door 9. The lever 31 is held down by the finger 32 which lies over the tab 31B, shown in FIGURE 21, which extends from lever 31. When the handle 3 is now moved to the OFF position, eccentric cam 33, best shown in FIGURE 22, engages the lever 30' at location 30A and moves lever 30' out of slot 32A of finger 32.

When the door 9 is opened, the finger 32 moves off the tab 31B of lever 31 allowing it to return to its own biased position where hook 31A engages slot 33A of eccentric cam 33 in FIGURES 22 and 23.

The screw 34 of FIGURE 21 operates both levers 30' and 31 such that when the door 9 is opened, the lever 31 can be rotated to release the cam 33 from the hook 31A so that the handle can be moved to the ON position. When the door 9 is closed and handle 3 is in the ON position, the screw 34 will rotate the lever 30' out of the slot 32A of the finger 32, allowing the door to be opened. When the unit is fully engaged within the motor control center and the handle 3 is in the ON position, the eccentric cam 33 engages the under side of the tray 26 immediately above it to prevent the unit from being pulled out to any position while the unit is energized.

The handle 3 is further provided with a locking lever 3A which pivots about the pivot 3B, as shown in FIGURES 11 and 25. When the lever 3A is pulled out, as shown in FIGURE 25, the finger 3C of FIGURE 24 will engage one of the slots 35A or 35B of the hub 35, shown in FIGURE 21, which is integral with handle 3. The slot 35A locks the handle in the OFF position, while the slot 35B allows the handle to be locked OFF, but also prevents the door 9 from being opened.

The screw shaft 3D of handle 3, best shown in FIGURE 24, engages the operating shaft 6 of the disconnect mechanism 4 in the square hole 6A, shown in FIGURES 22 and 23, and is held in place by a bolt 6B, as best shown in FIGURE 26, which passes through the entire length of shaft 6. An eccentric cam 6C is also attached to shaft 6 by the bolt 6B, as shown in FIGURE 26. The cam 33 is then connected to the connecting rod 37 which is connected to the operating shaft of the disconnecting device 4 at its opposite end.

The load side connections of the motor control unit are accomplished by a set of plug-in terminals of novel construction, shown in FIGURES 29 and 30, for the male portion of the assembly. The male portion of the assembly is directly secured to the side frame of the motor control unit, and consists of a base 51 which carries a wire grip and stab assembly. More particularly, and as shown in FIGURE 31, the base 51 has a cavity 51A which receives the wire grip and stab assembly which is locked into position by insulating strip 53 which slides into the slot 51B of the base 51. The insulating strip 53 is held in position by the metal mounting strip 58, best shown in FIGURE 32, on which the base 51 is mounted. A cover 59 is then attached to the base 51 by means of post 51e, shown in FIGURE 32, and a push-on nut 60 over the end of post 51e. Cover 59 is provided to prevent accidental contact with live parts of the plug-in terminal assembly.

The female portion of the plug-in terminal assembly is then permanently attached to the side carrier 82 of the motor control center 80 described in the above noted U.S. Patent No. 3,311,793, and is further shown in FIGURE 30. The female portion of the assembly is carried on base 64 which, as shown in FIGURE 33, is mounted on mounting strip 65 by grooves 65A and post 65B and ear 65C.

In order to remove base 64 from the mounting strip 65, a small flat tool is inserted into slot 66, shown in FIGURE 34, and pushes the ear 65C to the same level as the strap 65 allowing the base 64 to slide forward and across the strip 65. The U-shaped contact jaws 70 of FIGURES 34 and 35 are formed with a tang 71 on which the wire grip 72 sets with a small barb 73 (FIGURE 35) which prevents the contact jaws from being removed after they are inserted into the base 64. The necessary contact pressure is provided by the U-shaped spring 75 (FIGURE 34) which fits around the contact jaws 70. The wire grip 72 is then trapped in the base 64 by the tang 71 and the ledges 77, shown in FIGURE 34, which prevent the screw head 71a of the wire grip from moving forward.

Note that the female portion of the plug-in assembly can also be used as a terminal block. In this case, the contact jaw 70 would be replaced with a formed wire grip which would have a tang and barb similar to the contact jaws of FIGURES 34 and 35 for securement purposes. The wire grip would then be positioned in such a manner as to allow a wire to be attached from the front over the wire grip or from the back through a suitable slot.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In a motor control center; a plurality of compartments vertically arranged atop one another and including side members, horizontal members defining top and bottom compartment members, and a rear member, a wiring gutter extending vertically up and through one side of said copartments; a cover for each of said compartments pivotally mounted at the front of its respective compartment on the said one side of each of said compartments; a motor control unit mountable within each of said compartments; said motor control unit comprising a support structure comprising a bottom member, side members extending from said bottom member, a top meber extending across said side embers, and a rear member extending from said bottom member, and a plurality of motor control components connected to said support structure; said plurality of components including disconnect means, a control transformer, fuse means and a starter; said side members of said support structure being respectively adjacent said side members of their respective one of said compartments; a rotatable operating handle for said disconnect means, a support member for said operating handle, and a shaft extending from said handle, through said support member and to said disconnect means; said support member including a plate section extending from the said side of said support structure away from said one side of said compartments containing said wiring gutter.

2. The device of claim 1 wherein said plate section is generally L-shaped; said operating handle rotatable through an angle of 90° for operating said disconnect means and moving from one leg of said L-shaped plate section to the other leg of said L-shaped plate section.

3. The device of claim 1 which includes a weather-strip means around the periphery of said plate section and extending inwardly therefrom; the interior of said cover having a cut-out section extending around the periphery of said plate section when said cover is closed; said weather-strip means engaging the interior surface of said cover extending from said cut-out section when said cover is closed.

4. In a motor control center; a plurality of compartments vertically arranged atop one another and including side members, horizontal members defining top and bottom compartment members, and a rear member, a wiring gutter extending vertically up and through one side of said compartments; a cover for each of said compartments pivotally mounted at the front of its respective compartment on the said one side of each of said compartments; a motor control unit mountable within each of said compartments; said motor control unit comprising a support structure comprising a bottom member, side members extending from said bottom member, a top member extending across said side members, and a rear member extending from said bottom member, and a plurality of motor control components connected to said support structure; said plurality of components including disconnect means, a control transformer, fuse means and a starter; said side members of said support structure being respectively adjacent said side members of said compartment; said starter having line terminals on one side thereof and load terminals on the opposite side thereof; said disconnect means having line terminals on one side thereof and load terminals on the opposite side thereof; said starter and said disconnect means mounted adjacent one another; said load terminals of said starter adjacent and facing said wiring gutter; said line terminals of said starter adjacent and facing said load terminals of said disconnect means.

5. The device of claim 4 wherein said line and load terminals of said starter and disconnect means are vertically aligned with the corresponding line and load terminals respectively of starter and disconnect means of each of said motor control units vertically disposed with respect to one another in respective verticaly disposed compartments.

6. The device as set forth in claim 4 wherein said control transformer is positioned directly to the rear of said starter on said support structure.

7. The device of claim 6 which further includes fuse clip means mounted on the top of said control transformer; said control transformer having terminal means connected to said fuse clip means; said top member of said support structure having cut-out means aligned with said control transformer whereby said fuse clip means are accessible when said support structure is at least partially withdrawn from its respective compartment.

8. In a motor control center; a plurality of compartments vertically arranged atop one another and including side members, horizontal members defining top and bottom compartment members, and a rear member, a wiring gutter extending vertically up and through one side of said compartments; a cover for each of said compartments pivotally mounted at the front of its respective compartment on the said one side of each of said compartments; a motor control unit mountable within each of said compartments; said motor control unit comprising a support structure comprising a bottom member, side members extending from said bottom member, a top member extending across said side members, and a rear member extending from said bottom member, and a plurality of motor control components connected to said support structure; said plurality of components including disconnect means, a control transformer, fuse means and a starter; said side members of said support structure being respectively adjacent said side members of said compartment and fuse clip means mounted on the top of said control transformer; said control transformer having terminal means connected to said fuse clip means; said top member of said support structure having cut-out means aligned with said control transformer in a manner such that said fuse clip means are accessible when said support structure is at least partially withdrawn from its respective compartment.

9. In a motor control center; a plurality of compartments vertically arranged atop one another and including side members, horizontal members defining top and bottom compartment members, and a rear member, a wiring gutter extending vertically up and through one side of said compartments; a cover for each of said compartments pivotally mounted at the front of its respective compartment on the said one side of each of said compartments; a motor control unit mountable within each of said compartments; said motor control unit comprising a support structure comprising a bottom member, side members extending from said bottom member, a top member extending across said side members, and a rear member extending from said bottom member, and a plurality of motor control components connected to said support structure; said plurality of components including disconnect means, a control transformer, fuse means and a starter; said side members of said support structure being respectively adjacent said side members of said compartment; a pivotal frame pivotally mounted between said top and bottom members and rotatable in a plane parallel to said top and bottom members; a pilot light connected to said frame; said frame being pivotable from a flush position across the front of said support structure to an extending position extending away from said front of support structure; said cover having an opening therethrough; said opening registering with said pilot light when said cover is closed and said frame is in its said flush position.

10. The device as set forth in claim 9 wherein said fuse means are mounted across the front of said support structure; said frame extending across said fuse means when said frame is in its said flush position.

11. In a motor control center; a plurality of compartments vertically arranged atop one another and including side members, horizontal members defining top and bottom compartment members, and a rear member, a wiring gutter extending vertically up and through one side of said compartments; a cover for each of said compartments pivotally mounted at the front of its respective compartment on the said one side of each of said compartments; a motor control unit mountable within each of said compartments; said motor control unit comprising a support structure comprising a bottom member, side members extending from said bottom member, a top member extending across said side members, and a rear member extending from said bottom member, and a plurality of motor control components connected to said support structure; said plurality of components including disconnect means, a control transformer, fuse means and a starter; said side members of said support structure being respectively adjacent said side members of said compartment; a pivotally mounted holding means connected to said side of said support structure opposite said wiring gutter; said pivotally mounted holding means rotating in a plane perpendicular to the plane of said side members and the plane including the front surface of said support structure; the free end of said pivotally mounted holding means having a tapped opening therein; latch means connected from said pivotally mounted holding means to said compartment side wall adjacent thereto when said pivotally mounted holding means is in a first pivotal position; said cover having a securement screw extending therefrom and in registry with said tapped opening only when said pivotally mounted holding means is in said first pivotal position and said cover is closed; movement of said pivotally mounted holding means to a second position defeating said latch means and preventing securement of said cover in a closed position by said screw means.

12. In a motor control center; a plurality of compartments vertically arranged atop one another and including side members, horizontal members defining top and bottom compartment members, and a rear member, a wiring gutter extending vertically up and through one side of said compartments; a cover for each of said compartments pivotally mounted at the front of its respective compartment on the said one side of each of said compartments; a motor control unit mountable within each of said compartments; said motor control unit comprising a support structure comprising a bottom member, side members extending from said bottom member, a top member extending across said side members, and a rear member extending from said bottom member, and a plurality of motor control components connected to said support structure; said plurality of components including disconnect means, a control transformer, fuse means and a starter; said side members of said support structure being respectively adjacent said side members of said compartment; handle means connected to said support structure on the side of said support structure adjacent said wiring gutter; latch means connected to said side of said support structure adjacent said wiring gutter for latching said support structure within said compartment and a latch operating rod for defeating said latch means responsive to movement of said latch operating rod; said latch operating rod terminating adjacent said handle means whereby said latch operating rod can be conveniently depressed by an operator gripping said handle means.

13. In a motor control center; a plurality of compartments vertically arranged atop one another and including side members, horizontal members defining top and bottom compartment members, and a rear member, a wiring gutter extending vertically up and through one side of said compartments; a cover for each of said compartments pivotally mounted at the front of its respective compartment on the said one side of each of said compartments; a motor control control unit mountable within each of said compartments; said motor control unit comprising a support structure comprising a bottom member, side members extending from said bottom member, a top member extending across said side members, and a rear member extending from said bottom member, and a plurality of motor control components connected to said support structure; said plurality of components including disconnect means, a control transformer, fuse means and a starter; said side members of said support structure being respectively adjacent said side members of each of said compartments; the front edge of each of said horizontal members forming said compartments having a downwardly extending edge; said rear member of each of said support structures having an upwardly extending lip which catches said edge when said support structure is withdrawn from its said compartment.

References Cited
UNITED STATES PATENTS 3,140,426    7/1964    Pefandorf et al. _____ 317—120

ROBERT K. SCHAEFER, *Primary Examiner.*

M. GINSBURG, *Assistant Examiner.*